April 28, 1964   H. B. MORSE   3,130,451
DRAPE FRAME ASSEMBLY
Filed Feb. 2, 1961   2 Sheets-Sheet 1

INVENTOR.
Hugh B. Morse
BY
Townsend and Townsend
attorneys

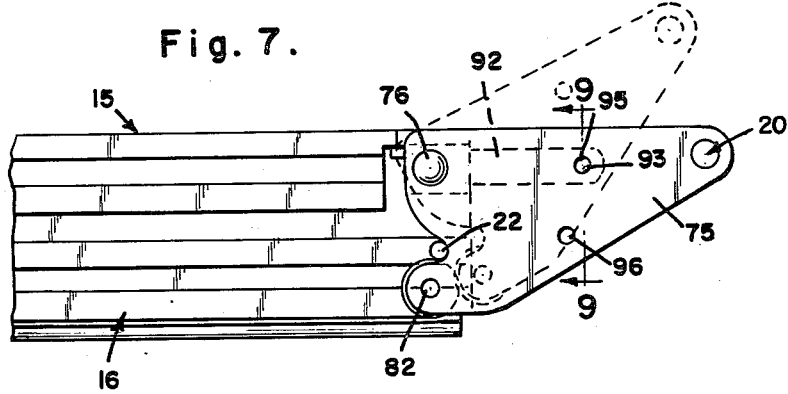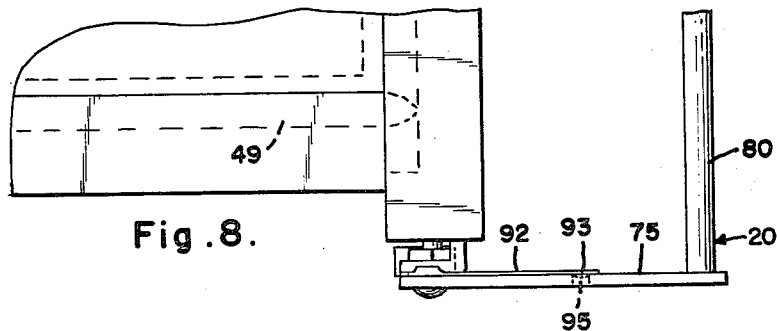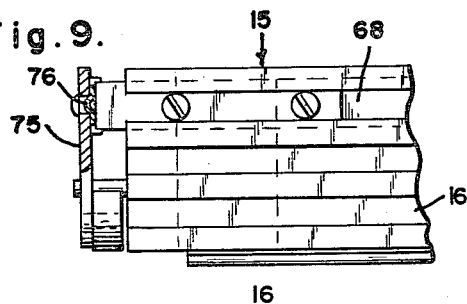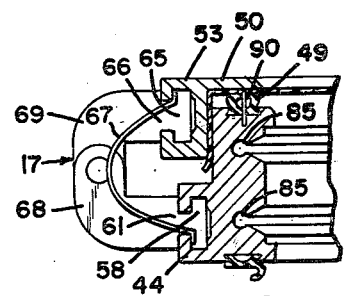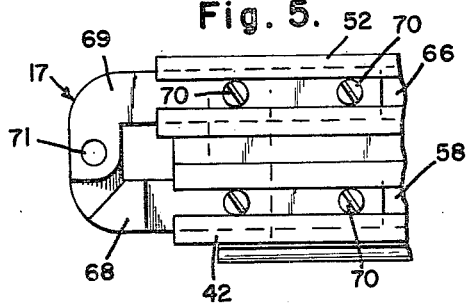

United States Patent Office 3,130,451
Patented Apr. 28, 1964

3,130,451
DRAPE FRAME ASSEMBLY
Hugh B. Morse, San Jose, Calif., assignor to Avery
Industries, Inc., San Mateo, Calif., a corporation of
California
Filed Feb. 2, 1961, Ser. No. 86,729
5 Claims. (Cl. 18—19)

This invention relates to a drape frame for holding sheet plastic material in a taut horizontal position for use in sheet plastic vacuum forming machines.

Sheet plastic vacuum forming machines generally comprise a drape frame which is adapted to hold a sheet of plastic material, such as polyethylene, in a taut condition. The drape frame is then raised and lowered relative to a platen which is adapted to carry a perforate board and an article to be packaged, and is also arranged to withdraw air through the board so that a vacuum is created immediately over the top surface of the board. A heating element is arranged above the drape frame and the drape frame is arranged to move between an upper position immediately adjacent the heating element to a lower position slightly above the material to be packaged.

In this device a plastic film is placed within the drape frame and the drape frame is raised to an upper position. The article to be packaged or a mold is placed on the platen. The plastic material is then heated by a heater over the drape frame. Thereafter the drape frame is lowered to a position immediately over the mold or the material to be packaged while simultaneously a vacuum is applied to cause an area of reduced pressure immediately adjacent the mold or article to be packaged. This causes the sheet material to intimately conform or adhere to the perforate board or air permeable board and articles mounted thereon.

One of the problems in such machines is in mounting the polyethylene or other plastic material within the drape frame. Usually such plastics are of extremely thin stock and are somewhat difficult to handle.

A principal object of this invention is to provide a novel drape frame which will crimp the sheet material firmly about all edges and hold it firmly in position during the heating and forming stages of operation.

Another problem associated with drape frames lies in the fact that the drape frame should function to create an air lock in all areas underneath the material when the drape frame is in the lowered position.

Another principal object of this invention is to provide a novel sealing gasket on the bottom face of the drape frame which coacts with the platen to form an air seal between the platen and the bottom of the drape frame.

A feature and advantage of the novel seal lies in the fact that the seal is arranged to provide a satisfactory air lock even when the platen suffers an irregular or unpolished face.

Another object of this invention is to provide a novel extrusion formation forming the side walls of the drape frame having channels on the top and bottom which are adapted to receive the gaskets for forming air lock seals and which further provides outer channels which receive fittings for the various devices used in the construction of the drape frame.

A feature and advantage of the outer channels lies in the fact that springs, hinge members, mounting brackets and closure brackets can be mounted within the channels.

A further object of this invention is to provide in the extrusion forming the side walls of the drape frame an interior cylindrical channel useful for receiving screws which are used to hold the walls of the extrusions together.

A still further object of this invention is to provide a novel drape frame assembly employing a plurality of springs on the rear portion of the frame tending to bias the two members of the frame in an open position. Each of the springs is removably mounted within channels formed on the rear of the frame so that the precise amount of opening tension can be controlled by merely adding or subtracting springs.

Still a further object of this invention is to provide in the novel drape frame an upper and lower frame member in which the upper member uniformly overlies the side wall of the lower member to provide a lock to prevent movement of the sheet plastic held within the frame and with the further provision of a gasket carried by the upper frame member of the lower frame member which engages the sheet material to form an air lock between the sheet material and atmosphere.

Still another object of this invention is to provide pins extending upwardly from the bottom frame of the drape frame assembly which will penetrate the sheet material to hold it in place prior to the time the upper frame is brought into its lower locked position.

Other objects of the present invention will become apparent upon reading the following specification and referring to the accompanying drawings in which similar characters of reference represent corresponding parts in each of the several views.

In the drawings:

FIG. 5 is a fragmentary side view showing the hinge mechanism for the drape frame assembly.

FIG. 6 is a cross-sectional view similar to FIG. 5 showing the hinge and the spring members tending to bias the frame members of the frame assembly in the open position.

FIG. 7 is a fragmentary side elevation showing the latch mechanism and handle holding the frame members of the assembly in the locked closed position.

FIG. 8 is a view similar to FIG. 7 taken in top plan.

FIG. 9 is a front elevation similar to FIGS. 7 and 8.

Figure 1:
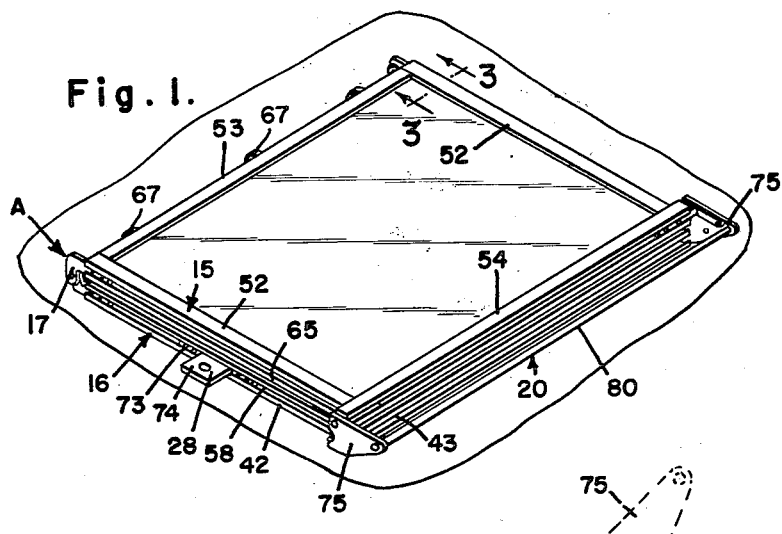
FIG. 1 is a perspective view showing the drape frame assembly of this invention.

The invention as embodied in the principal embodiment of the invention, as shown in the drawings, comprises a drape frame assembly A having an upper frame member 15 and a lower frame member 16. The two frame members are hinged together by a hinge assembly 17 mounted to the rear of each of the frame members.

A handle and locking assembly 20 is pivotally mounted on the front edges of the front portion of the upper frame member 15 and locks with a pin 22 mounted on the edge of the front of lower frame member 16.

Drape frame assembly A is arranged to move vertically relative to a platen B which is apertured with one or more apertures 25 in order to withdraw air from the area above platen B.

The mechanism, not shown, is arranged to engage two flange members 28 mounted on the outside of the side pieces of the bottom frame. The mechanism is arranged to raise and lower drape frame assembly A relative to platen B.

Figure 2:
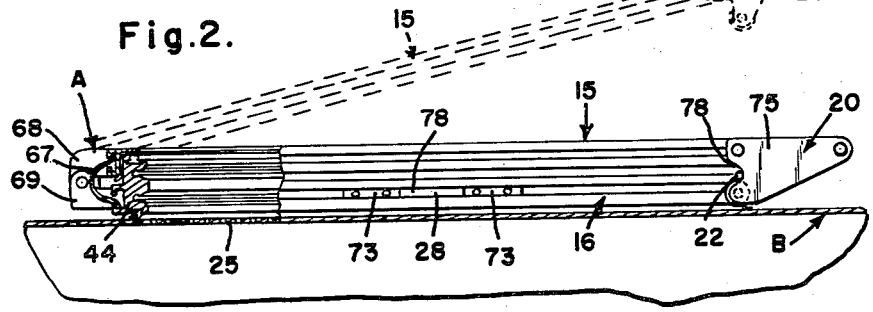
FIG. 2 is a side elevation of FIG. 1 partially broken away.
Figure 3:
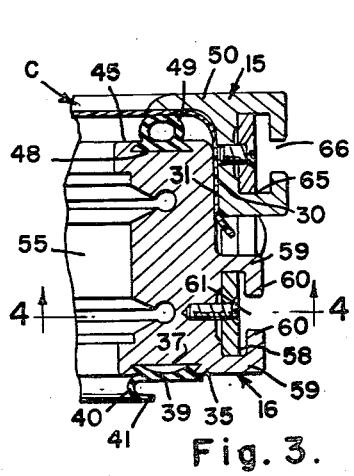
FIG. 3 is an enlarged fragmentary cross-sectional view showing the front walls of the upper and lower frame portions of the device.
Figure 4:
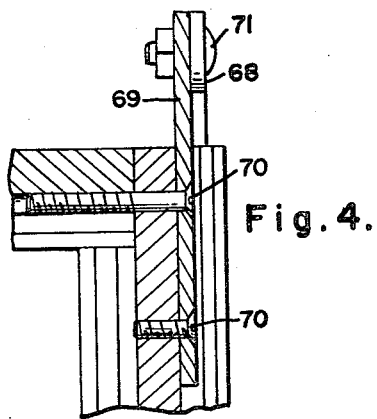
FIG. 4 is an enlarged fragmentary cross-sectional view showing the rear hinge assembly for the drape frame assembly.

Frame assembly A is arranged so that by lifting handle 20 upper frame member 15 will raise, as indicated in FIG. 2, to allow a sheet of polyethylene or other plastic material to be placed within the frame.

Upper frame member 15 is formed with depending edges the inside face 30 of which overlies the upper outer edges 31 of bottom frame member 16 when the two frames are in closed condition. By this means the polyethylene or other sheet material is held fast within the channel when the two frame members are closed.

Drape frame assembly A is then raised into heating engagement with a heating element, not shown, to cause the sheet material to be heated during which interval an article to be packaged can be set upon platen B under the frame. The frame is then lowered into contact with platen B and air is withdrawn through apertures 25 to cause atmospheric pressure to force the sheet material tightly down against the material to be packaged.

It is important that the frame form a substantial air seal relative to the platen so that a vacuum will be created within the interior of the frame under the sheet material on the top. To effect this the bottom wall 35 of lower frame member 16 is formed with a gasket receiving channel 37 into which a rubber gasket 39 is fitted. The gasket is formed of a severed hollow round rubber tube which has been severed along the outer edge to provide a downwardly and inwardly directed flange 40.

The lower edge 41 of flange 40 will engage the top of platen B in a manner similar to the action of a flutter valve. Thus atmospheric pressure will tend to force flange 40 inwardly and thereby force lower edge 41 tightly against the top face of the platen. Thus the higher the vacuum created in the area under the sheet material the greater will be the force holding gasket 39 in air sealing relationship with the platen.

Gasket 39 runs the entire length of lower frame member 16 including the two side walls 42, the front wall 43 and the rear wall 44.

The top edge 45 of walls 42, 43 and 44 of lower frame member 16 is formed with a similar channel 48 into which a cylindrical gasket 49 is mounted. Gasket 49 similarly runs the entire length of the various walls forming the bottom frame member.

The purpose of cylindrical gasket 49 is to engage the plastic film sheet C under an inwardly directed flange 50 of the two side walls 52, the rear wall 54 and the front wall 54 forming upper frame member 15.

Flanges 50 are inwardly directed to a point where they substantially overlay the gaskets in such a way that sheet material C is sandwiched under compression against the gasket. This creates an air seal between the plastic material and lower frame member 16. A completely sealed chamber 55 is thus formed by virtue of the combination of rubber gasket 39 engaging platen B and cylindrical gasket 49 sandwiching the sheet film material against inwardly directed flange 50 of upper frame member 15.

The cylindrical formation of cylindrical gasket 49 provides continual tensioning against the polyethylene and rubber gasket 39 provides a flutter type of gasket which tends to compensate for any irregularity in the surface of platen B so that the total seal within chamber 55 is extremely efficient. This is an important advantage in that it allows for the full efficient use of the vacuum pressure created by the machine in that a minimum leakage occurs.

Lower frame member 16 is formed in an extrusion providing the two aforesaid channels 37 and 48 on two upper and lower faces and an outwardly directed channel 58 formed by two spaced apart outward projections 59 having their terminal edges extending inwardly at 60. Channel 58 thus has an enlarged channel area with an open slot 61 opening into the enlarged channel.

Walls 52, 53 and 54 forming upper frame member 15 are similarly formed with a channel 65 identical to channel 58 in which the openings 66 to the channel is of reduced dimension. The two channels 58 and 65 serve to mount the various attachments for the frame to the frame.

Hinge 17 is formed of upper and lower arms 68 and 69. Upper arm 69 extends into channel 65 of side wall 52 and arm 68 extends into channel 58 of side wall 42. The two arms are rigidly held in place by screws 70 and are pivotally mounted by a pin 71. By this means upper and lower frames 15 and 16 are pivotally connected together at their rear.

A plurality of springs 67 are mounted in the channels 58 and 65 of rear walls 44 and 53. The springs engage the flanges forming the reduced openings 66 and 61. The springs create a tensioning that tends to force upper and lower frame members 15 and 16 apart. In this way there is a spring biasing force that tends to force the frame to move in its upper position as shown in the dotted lines of FIG. 2.

The numbers of springs 67 mounted in the respective channels 58 and 65 determine the amount of pre-stress or tensioning tending to hold the frames in the open position. It can readily be seen that the springs are easily removable so that the amount of tensioning can be easily and precisely adjusted.

Flange member 28 is mounted within channel 58 of side walls 42, the bracket being formed with a mounting base 83 which is carried in the channel with the bracket member 74 extending normal thereto through restricted opening 61 of the channel.

Handle and locking assembly 20 is similarly mounted within the respective channels and comprises a pair of side plates 75 which are pivotally mounted to a bearing arm 76. The bearing arm is inserted into channel 65 of front wall 54. The side plate is formed with a notch 78 which engages pin 22 when side plate 75 is moved to the downward position.

An actuating arm 80 interconnects the outer extremity of the two side plates and forms a convenient handle by which the movement of the upper frame can be controlled and the bracket plates moved into locking position with pin 22.

Precise locking with the pin is accomplished by providing a locking wheel 82 mounted on the bottom of bracket plate 75 which is located off center from pin 22 in such a way that the roller locks into off-center engagement behind the pin to securely lock the two channels in closed position. The inner wall of the bottom channel forming the bottom frame is formed with two circular areas indicated at 85. These are adapted to be self-tapping holes in which a screw can be inserted in order to hold the various parts of the bottom section of the frame together.

Pins 90 are mounted on the top of the rear walls 44 of lower frame 16 and extend upwardly through gasket 49. The pin is adapted to penetrate the plastic material so as to hold the plastic material in position so that it can be draped uniformly about the bottom frame member 16 and hold it in position while upper frame member 15 is pulled down into the locked position. Inwardly directed flange 50 of frame 15 is apertured to receive the pin.

A ball detent mechanism 92 is connected to the pivot point of bearing arm 76 and extends outwardly providing a ball 93 on the end of ball detent mechanism 92. This is adapted to engage two apertures 95 and 96 formed in side plates 75. The ball and aperture tend to hold the side plate in an upwardly extending position as shown in the dotted lines of FIGS. 2 and 7 and in the frame locking position as shown in the solid lines of FIGS. 2 and 7.

It can be seen by the unique structure of this device that the gaskets form a complete air seal for the frame assembly and that the side channels provide mounting means for the various hardware attachments which form the operating frame unit.

It is also to be observed that the action of the two vertical walls 30 and 31, upper frame 15 and lower frame 16 coact to tightly hold the plastic material from being dislodged in its tightly stretched engagement across the frame while cylindrical gasket 49 provides the air seal around the peripheral edge of the unit immediately under the plastic material.

Although the foregoing invention has been described in some detail by way of illustration and example for purposes of clarity of understanding, it is to be understood that certain changes and modifications may be practiced within the spirit of the invention as limited only by the scope of the appended claims.

What is claimed:

1. In a vacuum forming machine for vacuum forming sheet plastic material over a vacuum platen, a drape frame assembly for carrying a sheet of plastic material comprising upper and lower frames, hinge means joining the rear portions of the upper and lower frames for pivotal movement, locking means on the front portions of said frame for removably locking said upper and lower frames together, bottom gasket means mounted on the bottom side of said lower frame and adapted to engage the platen to form an air seal therebetween, and top gasket means mounted on the upper side of the lower frame to engage the lower side of said upper frame member to form an air seal therebetween, said lower and upper frames having overlapping mating vertical walls adapted to lock margins of sheet material therebetween with the sheet material interposed between the top gasket means and the upper side of said upper frame.

2. A drape frame assembly according to claim 1 and wherein said bottom gasket is formed of a resilient material, said gasket having a configuration in section that is U-shaped and so disposed that the concave side of the configuration faces outwardly.

3. In a vacuum forming machine for vacuum forming sheet plastic material over a vacuum platen, a drape frame assembly for carrying the plastic material comprising upper and lower frames, hinge means joining the rear portions of the upper and lower frames for pivotal movement, locking means on the front portions of the frames for removably locking said upper and lower frames together, gasket means mounted on the bottom side of said lower frame member and adapted to engage said platen to form an air seal therebetween, gasket means mounted on the top side of said lower frame and disposed to engage the lower side of said upper frame member to form an air seal therebetween, said lower and upper frames having overlapping mating vertical wall portions adapted to lock the margins of sheet material therebetween with the sheet material being disposed between the top gasket means and said upper frame, said locking means including means pivotally connected to the forward portion of the upper frame and forming a handle, and means acting between said last named means and the forward corner portions of the lower frame for locking the upper and lower frame together responsive to movements of the handle in a vertical direction relative to the assembly.

4. In a vacuum forming machine for vacuum forming sheet plastic material over a vacuum platen a drape frame assembly carrying the plastic material comprising upper and lower frames, hinge means joining the rear portions of the upper and lower frames for pivotal movement, locking means on the front portion of the assembly for removably locking said upper and lower frames together, gasket means mounted on the bottom of said lower frame and engaging said platen to form an air seal therebetween, gasket means mounted on the top of said lower frame to engage the bottom side of said upper frame to form an air seal therebetween, said lower and upper frames having overlapping mating vertical walls adapted to lock margins of sheet material therebetween with the sheet material being disposed between the top gasket means and said top frame, latch arms pivotally mounted on the forward corners of the upper frame, a handle bar extending between the forward extremities of said latch arms and spaced forwardly from the assembly, and means forming an interlock between said latch arms and the forward corners of the lower frame when the handle is moved downwardly after the upper frame has been swung down on the lower frame.

5. A machine as in claim 4 in which said last means includes pins mounted on the lower frame and rollers mounted on the latch arms and adapted to lock beneath said pins when the handle is moved downwardly as aforesaid.

References Cited in the file of this patent
UNITED STATES PATENTS

| | | |
|---|---|---|
| 2,196,032 | Schmitt | Apr. 2, 1940 |
| 2,371,729 | Aspenleiter | Mar. 20, 1945 |
| 2,682,322 | Bloedow | June 29, 1954 |
| 2,694,227 | Fordyce et al. | Nov. 16, 1954 |
| 2,702,411 | Winstead | Feb. 22, 1955 |
| 2,725,804 | Herzfeld | Dec. 6 1955 |
| 2,783,500 | Lazarr | Mar. 5, 1957 |
| 2,814,077 | Moncrieff | Nov. 25, 1957 |
| 2,905,969 | Gilbert et al. | Sept. 29, 1959 |
| 2,954,725 | Palmer | Oct. 4, 1960 |

FOREIGN PATENTS

| | | |
|---|---|---|
| 786,416 | Great Britain | Nov. 20, 1957 |

OTHER REFERENCES

Modern Plastics, Vacuum Forming Equipment and Methods, vol. 31, No. 9, May 1954, pp. 90–91.